United States Patent
Schmitt et al.

(10) Patent No.: US 10,802,868 B1
(45) Date of Patent: Oct. 13, 2020

(54) MANAGEMENT OF TRANSACTIONS FROM A SOURCE NODE TO A TARGET NODE THROUGH INTERMEDIARY NODES IN A REPLICATION ENVIRONMENT

(71) Applicant: INTERNATIONAL BUSINESS MACHINES CORPORATION, Armonk, NY (US)

(72) Inventors: Christof Schmitt, Tucson, AZ (US); Tomas Krojzl, Brno (CZ); Erik Rueger, Ockenheim (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/733,197

(22) Filed: Jan. 2, 2020

(51) Int. Cl.
*G06F 9/46* (2006.01)
*H04L 12/24* (2006.01)

(52) U.S. Cl.
CPC .............. *G06F 9/466* (2013.01); *H04L 41/12* (2013.01); *H04L 41/22* (2013.01)

(58) Field of Classification Search
None
See application file for complete search history.

(56) References Cited

U.S. PATENT DOCUMENTS

| 7,325,019 | B2 | 1/2008 | Lam et al. |
| 7,395,352 | B1 | 7/2008 | Lam et al. |
| 8,132,043 | B2 | 3/2012 | Dash et al. |
| 8,572,431 | B2 | 10/2013 | Adler et al. |
| 9,032,173 | B2 | 5/2015 | Blea et al. |
| 9,400,720 | B2 | 7/2016 | Sathyanarayana et al. |
| 9,495,258 | B2 | 11/2016 | Sampath et al. |
| 9,619,350 | B1 | 4/2017 | Ambat et al. |
| 9,639,439 | B2 | 5/2017 | Laicher et al. |
| 10,261,872 | B2 | 4/2019 | Boshev et al. |
| 2015/0339200 | A1 | 11/2015 | Madduri et al. |
| 2018/0067827 | A1 | 3/2018 | Gallagher et al. |
| 2018/0232429 | A1 | 8/2018 | Singh |
| 2018/0288146 | A1 | 10/2018 | Wang et al. |

(Continued)

OTHER PUBLICATIONS

M. Alshammari, et al., "Disaster Recovery with Minimum Replica Plan for Reliability Checking in Multi-Cloud", Elsevier B.V., 2018. pp. 8.

(Continued)

*Primary Examiner* — Craig C Dorais
(74) *Attorney, Agent, or Firm* — David W. Victor; Konrad Raynes Davda & Victor LLP

(57) ABSTRACT

Provided are a computer program product, system, and method for management of transactions from a source node to a target node through intermediary nodes in a replication environment. A first tracking entry represents a transaction to transfer data from the source node to the target node that is received from a predecessor node in a first topology comprising one of the source node and the intermediary nodes to transmit to a first successor node and forwarded to the target node. A second topology is received including indication of a change to the first topology by including a second successor node not in the first topology. A second tracking entry is created for the transaction received from the predecessor node to send to the second successor node in response to data for the transaction having not yet been delivered to the target node.

25 Claims, 8 Drawing Sheets

(56) References Cited

U.S. PATENT DOCUMENTS

2018/0365120 A1    12/2018   Apte et al.
2019/0114230 A1     4/2019   Ramachandran et al.

OTHER PUBLICATIONS

"Global Disaster recovery as a service (DRaaS) Market | Size, Growth, Trends, Industry Analysis, Forecast 2022", [online]{retrieved Oct. 24, 2019] https://www.marketsandmarkets.com/Market-Reports/recovery-as-a-serv . . . .

J.J. Kang, et al. "A Disaster Recovery System for Location Identification-based Low Power Wide Area Networks (LPWAN)", 2017 27th International Telecommunication Networks and Applications Conference (ITNAC), IEEE, 2017, pp. 6.

R.S. Manktala, "Optimization of Disaster Recovery Leveraging Enterprise Architecture Ontology", Thesis, Ohio State University, 2013, pp. 70.

T. Ngo, et al., "A Novel Graph-based Topology Control Cooperative Algorithm for Maximizing Throughput of Disaster Recovery Networks", IEEE, 2016, pp. 6.

Z.U. Saquib, et al., "A new approach to disaster recovery as a service over cloud for database system".

Topology Information

Transaction Entry

Tracking Entry

MANAGEMENT OF TRANSACTIONS FROM A SOURCE NODE TO A TARGET NODE THROUGH INTERMEDIARY NODES IN A REPLICATION ENVIRONMENT

BACKGROUND OF THE INVENTION

1. Field of the Invention

The present invention relates to a computer program product, system, and method for management of transactions from a source node to a target node through intermediary nodes in a replication environment.

2. Description of the Related Art

Data backup systems can provide continuous availability of production data in the event of a sudden catastrophic failure at a single point in time or data loss over a period of time. In one such disaster recovery system, production data is replicated from a local site to a remote site which may be separated geographically by several miles from the local site. Such dual, mirror or shadow copies are typically made in a secondary storage device at the remote site, as the application system is writing new data to a primary storage device usually located at the local site. Different data replication technologies may be used for maintaining remote copies of data at a secondary site, such as International Business Machine Corporation's ("IBM") Metro Mirror Peer to Peer Remote Copy (PPRC), Extended Remote Copy (XRC), Coupled XRC (CXRC), Global Copy, and Global Mirror Copy.

Government regulation may place restrictions on certain types of protected data, such as requiring that data not leave a country or political region. Regulations may also require that financial and other sensitive data be distributed to remote locations that will not be affected by a disaster at one location having the data.

There is a need in the art for providing improved techniques for managing transactions from a source node to a target node in a replication environment.

SUMMARY

Provided are a computer program product, system, and method for management of transactions from a source node to a target node through intermediary nodes in a replication environment. A first tracking entry represents a transaction to transfer data from the source node to the target node that is received from a predecessor node in a first topology comprising one of the source node and the intermediary nodes to transmit to a first successor node and forwarded to the target node. A second topology is received including indication of a change to the first topology by including a second successor node not in the first topology. A second tracking entry is created for the transaction received from the predecessor node to send to the second successor node in response to data for the transaction having not yet been delivered to the target node.

With the above embodiment, to ensure that data that has not been confirmed as delivered to the target node is replicated, a second tracking entry is created for a transaction to send to a successor node in the new topology. This ensures that if data is lost due to the change in topology or successor nodes in the old topology being unavailable, the data for a transaction that has not been delivered is forwarded through the new topology to ensure replication in the system.

In a further embodiment, the second tracking entry is created if the data for the transaction has been transmitted to the first successor node but not yet delivered to the target node.

With the above embodiment, even if the data for a transaction has been sent to a first successor node in the old topology, the data is retransmitted to a second successor in the new topology if the data has not been confirmed as delivered to the target node to increase likelihood of data reaching the target node if transmission is disrupted somewhere in the old topology.

In a further embodiment, a determination is made of any additional topologies having topology times greater than a transaction time of the transaction and successor nodes for the additional topologies. A tracking entity is created for the transaction for each additional topology and for each successor node in the additional topology to transfer data for the transaction to each successor node in each of the additional topologies.

With the above embodiment, tracking entries are created having topology times greater than the transaction time to ensure that open transactions are always sent using a new route (as old route might be lost). This ensures the data for a transaction is always maintained in an active topology even if nodes in the previous topology have been lost.

In a further embodiment, a determination is made of an earlier topology comprising a prior topology having a topology time less than the transaction time. A tracking entity is created for the transaction for the prior topology and for each successor node in the prior topology to transfer data for the transaction to each successor node in the prior topology.

With the above embodiment, the timestamp is used to create a tracking entry for a latest topology where the transaction time is less than the topology creation time to ensure the topology is used that was active at the transaction time.

In a further embodiment, in response to receiving the second topology, a determination is made of tracking entries for transactions whose data was transmitted to the first successor node that have not been confirmed as delivered to the target node. The data for the transactions for the determined tracking entries are transmitted to the second successor node.

With the above embodiment, data redundancy is maintained because for those transactions that have not been confirmed to have completed at the target node, the data is transmitted to the new successor node in the new topology to ensure that data reaches the target node in case the data has been lost in the replaced topology due to a disruption in the network availability of the nodes in the replaced topology.

In a further embodiment, the operations at a third node that is a successor to both the first successor node and the second successor node comprises: receiving data for a same transaction to transfer to the target node from both the first successor node and the second successor node; providing a first tracking entry for the same transaction at the third node indicating the first successor node as a first predecessor node; and providing a second tracking entry for the same transaction at the third node indicating the second successor node as a second predecessor node.

With the above embodiment, first and second tracking entries are created to monitor the transmission of a data for a transaction that is sent to a first processor node in the old topology and a second processor node in the new topology to allow for separate tracking of data being transmitted through different topologies for the same transaction.

Further provided are a computer program product, system, and method for providing information on transactions from a source node to a target node via intermediary nodes between the source node and the target node in a network. Tracking entries are maintained for transactions to transfer data between the source node and the target node at intermediary nodes. The transactions are transmitted to the intermediary nodes according to a first topology. For each pending transaction and node in the network there is a tracking entry. A tracking entry of the tracking entries for each node indicates a predecessor node in a first topology and causes transfer of data from the first predecessor node to a first successor node in the first topology. A second topology is generated including a second successor node to the predecessor node not in the first topology. For transactions having tracking entries for the first topology that have not been confirmed as delivered to the target node, tracking entries are created to transfer data to the second successor node that have not been confirmed as delivered to the target node.

With the above embodiment, when a new topology is generated, tracking entries are created and sent to the intermediary nodes for pending transactions that have not been confirmed as delivered to the target node to send to the new successor node in the new topology to ensure that data for the transaction reaches the target node in the event there is a disruption in the old topology that would prevent data in transit to the target node from reaching the target node. In this way, replicating data for transactions through both the old and new topologies increases likelihood the data reaches the target node and is properly mirrored.

In a further embodiment, a graphical user interface (GUI) renders transaction entries at the source node, the intermediary nodes to receive data for the transaction entries according to the first or second topology, and the target node. The transaction entries are rendered with one of a plurality of visual indicia that indicate a status of the transaction as received at an intermediary node and the target node. The GUI further renders the tracking entries at the intermediary nodes, wherein the tracking entries are rendered with one of a plurality of visual indicia that indicate a status of the transaction.

The above embodiment renders a visualization that shows the flow of transactions, via tracking entries, through the nodes of the network in different topologies. This allows the administrator to monitor traffic through the disaster recovery network and the status of nodes.

DETAILED DESCRIPTION

In managing a replication environment of nodes in a network for a disaster recovery network, target node locations for storing the replicated data may change. Further, as traffic is monitored, alternate topologies of intermediary nodes in the network and data paths may provide improved performance of transferring transactions from a source node to a target node. A new topology may optimize the overall data flow by selecting optimal target locations from a failover area for every failover group taking into consideration Service Level Agreement (SLA) targets such as maximum latency and existing network utilization ("existing latency" and "bandwidth utilization" vs. "bandwidth capacity").

Described embodiments provide improvements to computer technology for managing the flow of transactions in a disaster recovery network when there are topology changes resulting in changes to the nodes in the network. Described embodiments allow for automated management of transactions in transit through the nodes of the network when there is a topology change, e.g., replacement or removal of nodes in the work flow topology, to ensure that redundant copies of the transactions are maintained throughout the nodes in the new topology to be available for recovery at the nodes in the network. Described embodiments may be implemented as part of a Disaster Recovery Replication as a Service (DRRaaS) to provide for replication of transactions through the network nodes so that data remains redundant and available even as there are changes to the topology defining a logical Disaster Recovery (DR) model.

Figure 1A:
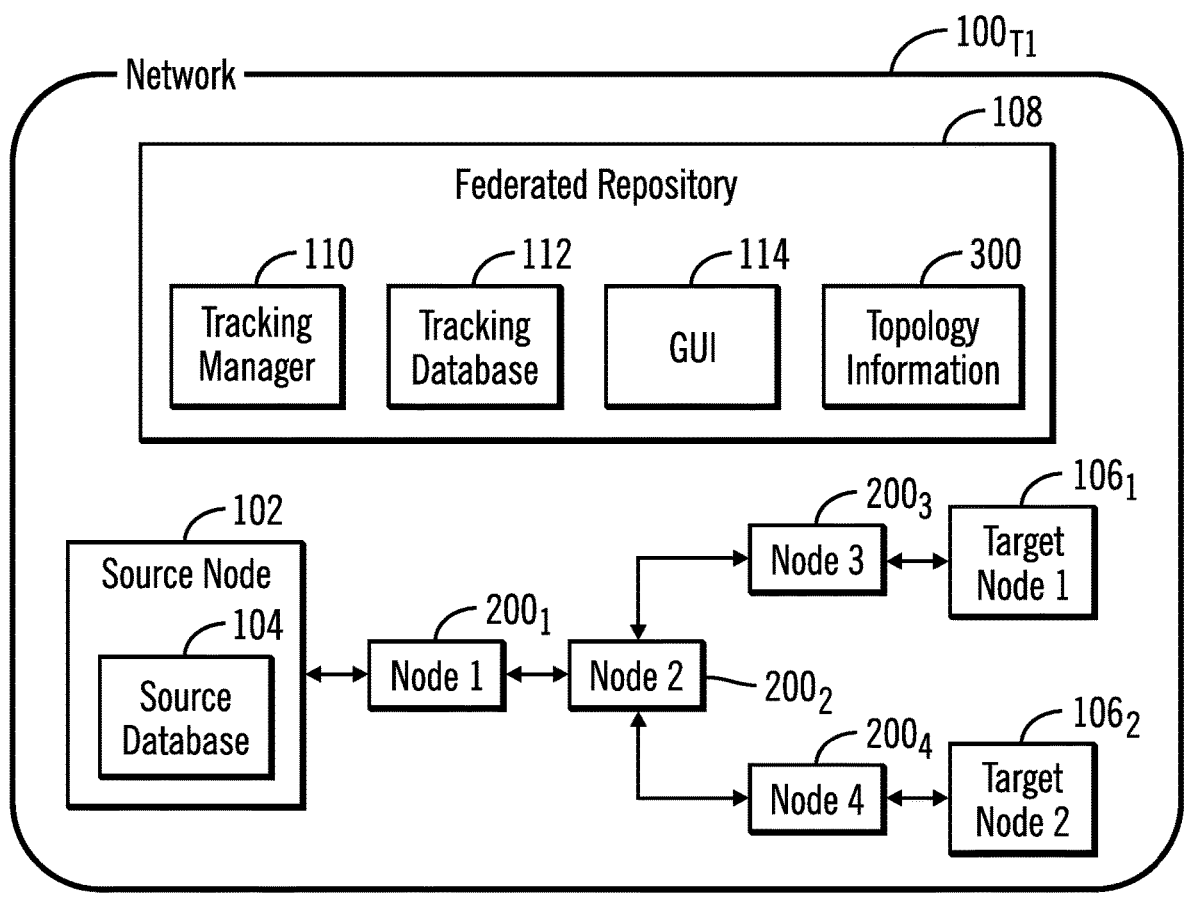
FIGS. 1A and 1B illustrate an embodiment of a network of nodes.

FIG. 1A illustrates an embodiment of a network computing system $100_{T1}$ at time T1, such as a disaster recovery system, having a source node 102 having a source database 104 with information on transactions including data to transmit to one or more target nodes $106_1$ and $106_2$ via intermediary nodes $200_1$, $200_2$, $200_3$, $200_4$ that are linked according to a topology. The network 100 may further include a federated repository 108 having a tracking manager 110 to track transactions through the nodes in the network $100_{T1}$, tracking database 112 for all nodes in the network $100_{T1}$, topology information 300 having information on one or more topologies or data flow sequences among the nodes in the network 100, and a Graphical User Interface (GUI) 114 to render a representation of the nodes in the network 100 according to the topologies in the topology information 112, and the status of the transactions being processed at the nodes.

The source node 102 and target nodes $106_1$ and $106_2$, and the intermediary nodes $200_1$, $200_2$, $200_3$, $200_4$ may be at sufficiently distant geographical regions to allow for disaster recovery of the data in case of a disaster destroying one or more of the nodes in the network 100. Further, a transaction of data to write from the source node 102 to the target nodes $106_1$ and $106_2$ may be persisted at the different intermediary nodes $200_1$, $200_2$, $200_3$, $200_4$ nodes as the transaction and its payload flow through the network nodes according to a current topology.

Figure 1B:
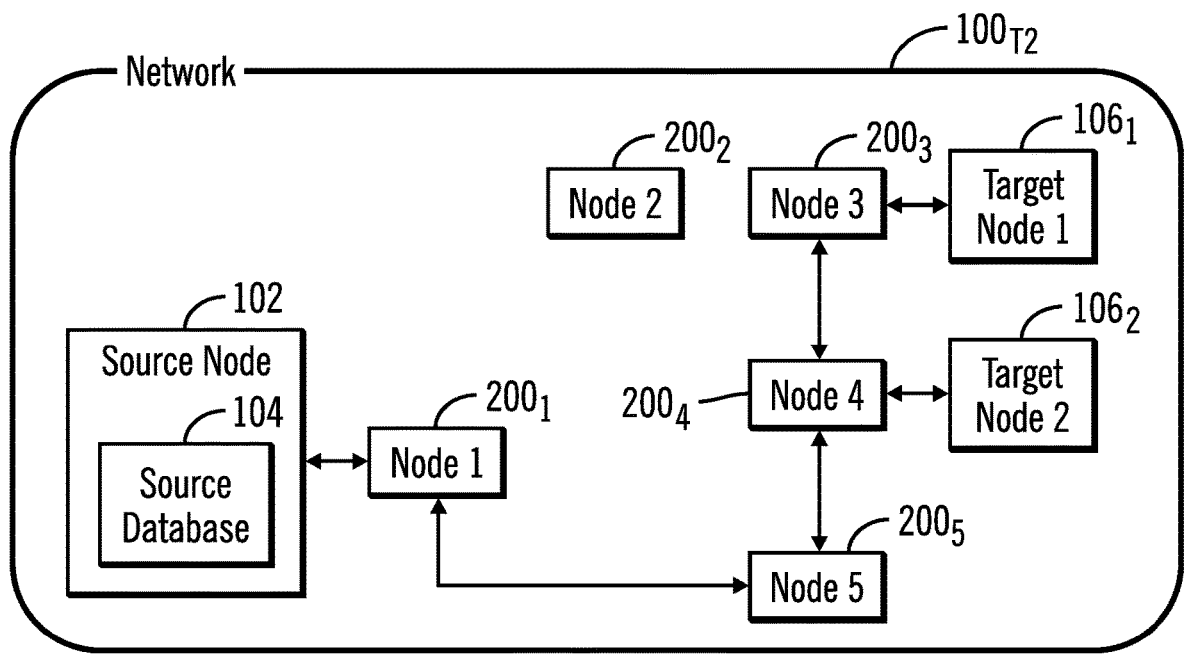

FIG. 1B illustrates an embodiment of the network $100_{T2}$ at a time T2 after the topology has changed to a new topology in which node $200_2$ is removed and replaced with node $200_5$ and a new topological flow, where data from the source node 102 to node $200_1$, to node $200_5$, to node $200_4$, to node $200_3$, and from nodes $200_3$ and $200_4$ to target nodes $106_1$ and $106_2$, respectively. In the topology of FIG. 1Bb, node $200_2$ is removed from the topology, however the node $200_2$ may still be available to the other nodes in the network or unavailable due to an error or failure at node $200_2$, such as a failure due to a disaster in the geographical region including node $200_2$.

FIGS. 1A and 1B show arrows to illustrate the program flow of transactions between the source node 102 and target nodes $106_1$ and $106_2$ intermediary nodes $200_1$, $200_2$, $200_3$, 2004.

Figure 2:
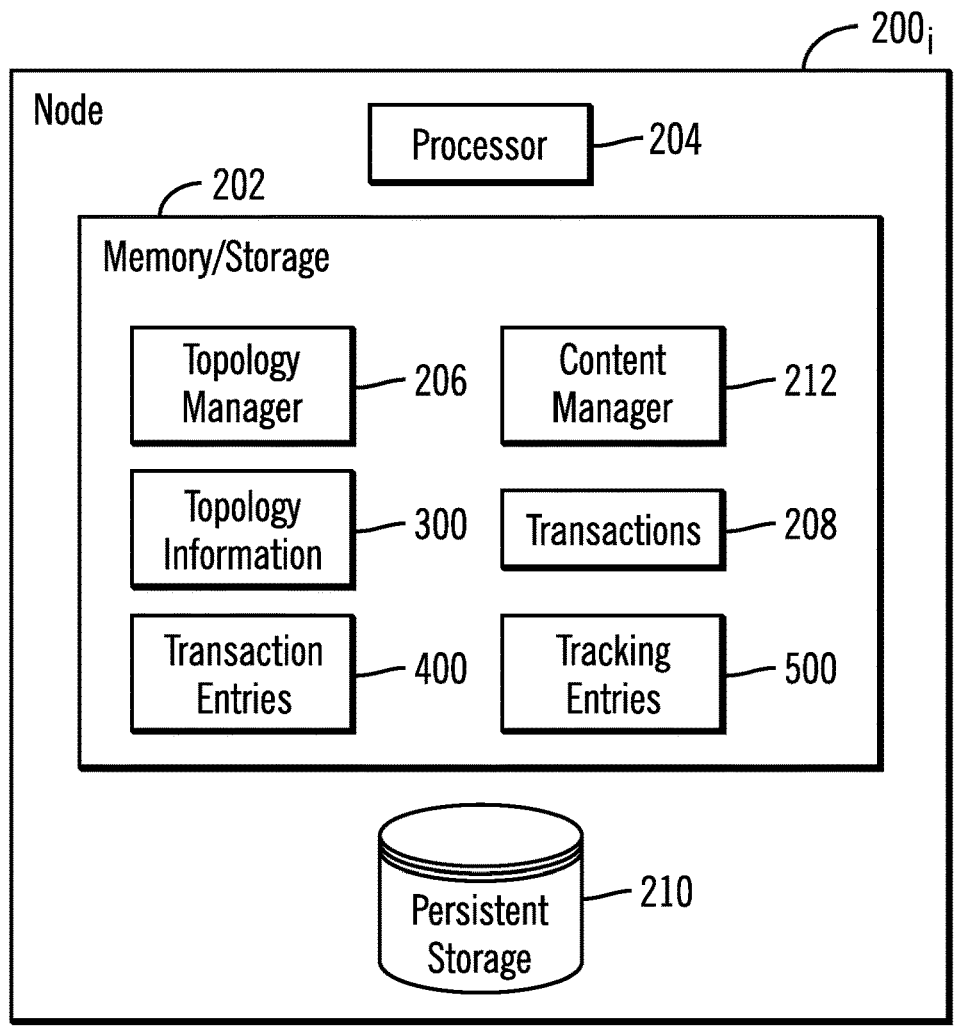
FIG. 2 illustrates an embodiment of a node in a network of nodes to transfer transactions from a source node to a target node.

FIG. 2 illustrates an embodiment of an intermediary node $200_i$, such as one of nodes $200_1$, $200_2$, $200_3$, $200_4$ in FIGS. 1A and 1B. Intermediary node $200_i$ may include a memory/storage 202 and a processor 204 or processor complex of one or more processor cores for executing programs in the memory 202. The memory/storage 202 includes: a topology manager 206 to manage different topologies of the nodes; topology information 300 having information on the topology of the nodes for different instances of the topology at different times; transactions 208 with a payload originating from the source node 102 forwarded from a predecessor node comprising the source node 102 or an intermediary node $200_j$; transaction entries 400 having information on received transactions 204; a storage 210 to store and persist payloads from transactions being sent to the target nodes $106_1$ and $106_2$; a content manager 212 to create and manage the transaction entries 300 and tracking entries 500; and tracking entries 500 having information on the status of transactions being forwarded to successor nodes to the node $200_i$.

The memory/storage 202 may comprise one or more memory and/or storage devices known in the art, such as a solid state storage device (SSD) comprised of solid state electronics, NAND storage cells, EEPROM (Electrically Erasable Programmable Read-Only Memory), Dynamic Random Access Memory (DRAM), flash memory, flash disk, Random Access Memory (RAM) drive, storage-class memory (SCM), Phase Change Memory (PCM), resistive random access memory (RRAM), volatile and non-volatile Direct In-Line Memory Modules (DIMMs), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor. The memory/storage 202 thus may comprise a suitable volatile or non-volatile memory devices, including those described above.

Generally, program modules, such as the topology manager 206, content manager 212, and tracking manager 110 of the federated repository 108 may comprise routines, programs, objects, components, logic, data structures, and so on that perform particular tasks or implement particular abstract data types. The program components and hardware devices of the nodes in FIGS. 1A, 1B, and 2 and federated repository 108 of FIG. 1A may be implemented in one or more computer systems, where if they are implemented in multiple computer systems, then the computer systems may communicate over a network.

The program components 110, 206, 212 may be accessed by a processor from a memory to execute. Alternatively, some or all of the program components may be implemented in separate hardware devices, such as Application Specific Integrated Circuit (ASIC) hardware devices.

The functions described as performed by the programs 110, 206, 212 may be implemented as program code in fewer program modules than shown or implemented as program code throughout a greater number of program modules than shown.

Figure 3:
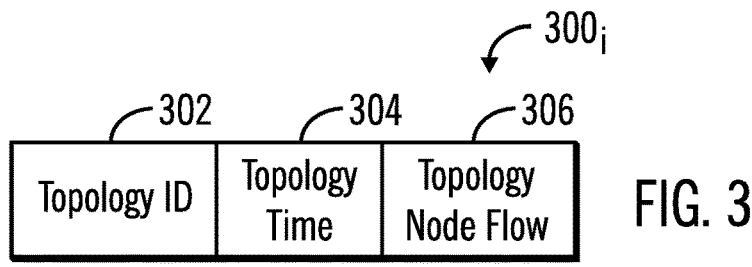
FIG. 3 illustrates an embodiment of topology information of a topology of data flow paths through nodes in a network.

FIG. 3 illustrates an embodiment of an instance of topology information $300_i$ in the topology information 300, including a topology identifier 302; a topology time 304 the topology $300_i$ became active in the network 100; and a topology node flow 306 indicating an arrangement of intermediary nodes and the flow of data through the intermediary nodes from the source node 102 to the target nodes $106_1$ and $106_2$. There may be multiple instances of topology information $300_i$ providing network topologies implemented at different times in the nodes of the network $100_{Ti}$. The topology node flow may indicate for each predecessor nodes a list of one or more successor nodes to which the predecessor node connects.

Figure 4:
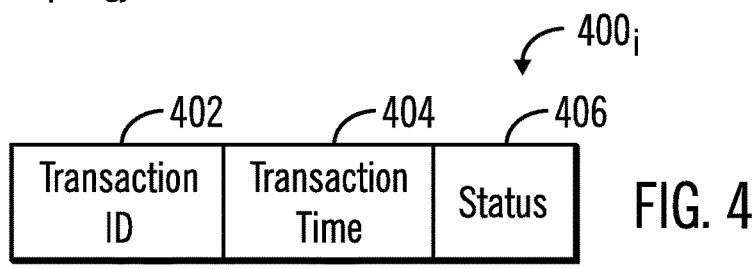
FIG. 4 illustrates an embodiment of a transaction entry for a transaction from a source node.

FIG. 4 illustrates an embodiment of a transaction entry $400_i$ for a transaction received at the node $200_i$ from a predecessor node $200_P$ in the topology or the source node 102 in the topology node workflow 306, and includes: a transaction identifier 402 of the received transaction 204; a transaction time 404 that the transaction was created at the source node 102; and a status 406 of the transaction, such as received or not received yet from the predecessor node $200_P$.

Figure 5:
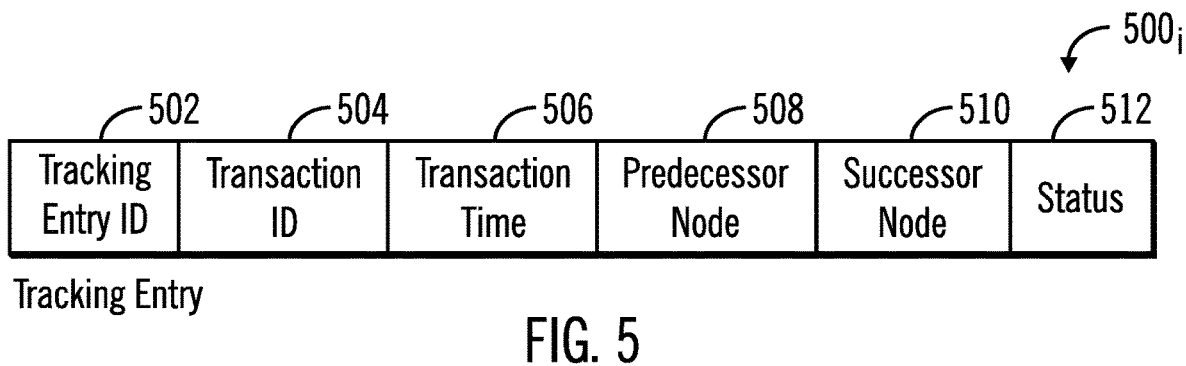
FIG. 5 illustrates an embodiment of a tracking entry to represent a transaction at the nodes in the network.

FIG. 5 illustrates an embodiment of a tracking entry $500_i$ generated to provide information for a transaction entry $400_i$ and includes: a tracking entry ID 502; a transaction ID 504 identifying a transaction entry $400_i$ of the transaction represented; a transaction time 506 the transaction was generated at the source node 102; a predecessor node 508 at which the transaction 504 was received; a successor node 510 to which the transaction 504 will be forwarded in the topology; and a status 512 of the processing of the transaction 504, including the transaction has been received or not received, the transaction has been received at the successor node 510, delivered to the target nodes $106_1$ and $106_2$, or is in progress of being transferred to the successor node 510.

In the embodiment of FIG. 5, the successor node 510 may be associated with the tracking entry $500_i$ by indicating the successor node in field 510. Other techniques may be used to indicate the successor node 510 is associated with a tracking entry $500_i$. For example, the node $200_i$ may maintain columns or groups of tracking entries $500_i$ for successor nodes, such that the column or group indicates the successor node to which the transaction represented by the tracking entry $500_i$ is forwarded.

In certain topologies, an intermediary node $200_i$ may receive multiple instances of one or a same transaction on multiple different predecessor nodes. Further, there may be one tracking entry $500_i$ for each successor node on which the transaction is to be forwarded to track the status of the transmission of the transaction through the particular successor node.

Figure 6:
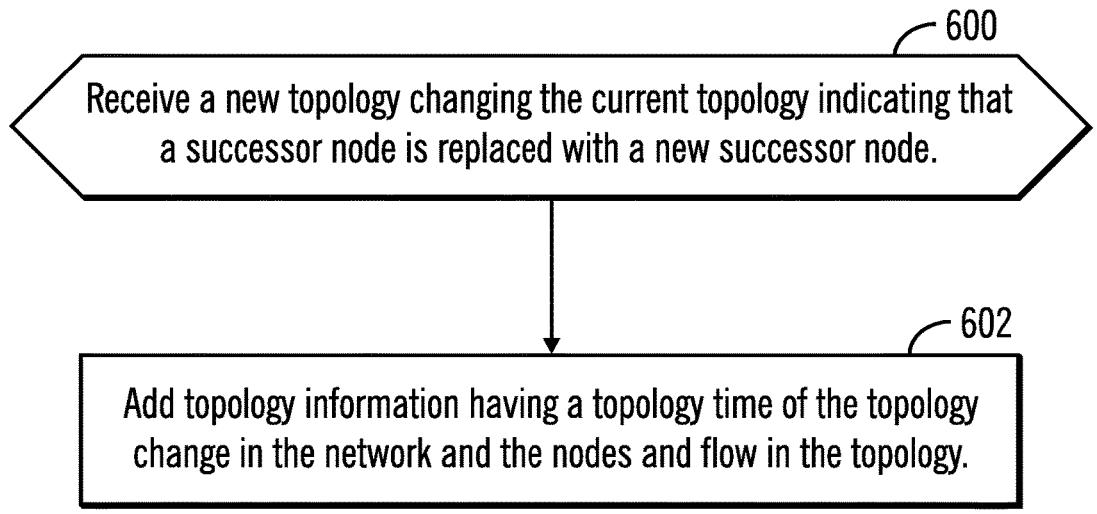
FIG. 6 illustrates an embodiment of operations to add a new topology at a node.

FIG. 6 illustrates an embodiment of operations performed by components at a node $200_i$, such as by the content manager 212 and topology manager 206, upon receiving a new topology changing the current topology that indicates a successor node $200_{S1}$ is to be replaced with a new successor node $200_{S2}$. Upon receiving (at block 600) a new topology, the topology manager 206 adds (at block 602) an instance of topology information $300_i$ to the topology information 300 indicating a topology ID 302, a topology time 304 the topology was implemented in the network 100, and a topology node flow 306 indicating the nodes $200_i$ in the topology and their flow.

With the embodiment of FIG. 6, each node $200_i$ maintains topology information $300_i$ for each topology implemented in the network overtime. This allows the nodes to determine the predecessors and successor nodes for transactions that were received during different topology implementations by determining the topology being implemented in the network 100 at the time the transaction was created at the source node 102.

The topology $300_i$ may change due to monitoring the current topology according to Key Performance Indicators (KPIs) (maximum latency, prioritization against other systems, etc.) The federated repository 108 may continuously monitor existing utilization of "DR pipes" (bandwidth and latency) and apply logistical algorithms to continuously optimize the physical distribution models to achieve prescribed KPIs (rerouting via different pipe). The federated repository 108 may apply logistical algorithms to manage relative weight of individual DR models to achieve prescribed KPIs (slowing down less critical to save bandwidth for higher priority models). Potential outage (network link down) would automatically re-balance the load across available "DR pipes" according to prioritization and specified KPIs. The result of this monitoring and management of the DR pipes may result in a new topology $300_i$ through the intermediary nodes $200_1$, $200_2$, $200_3$, $200_4$ of the network 100 to provide for improved performance.

Figure 7:
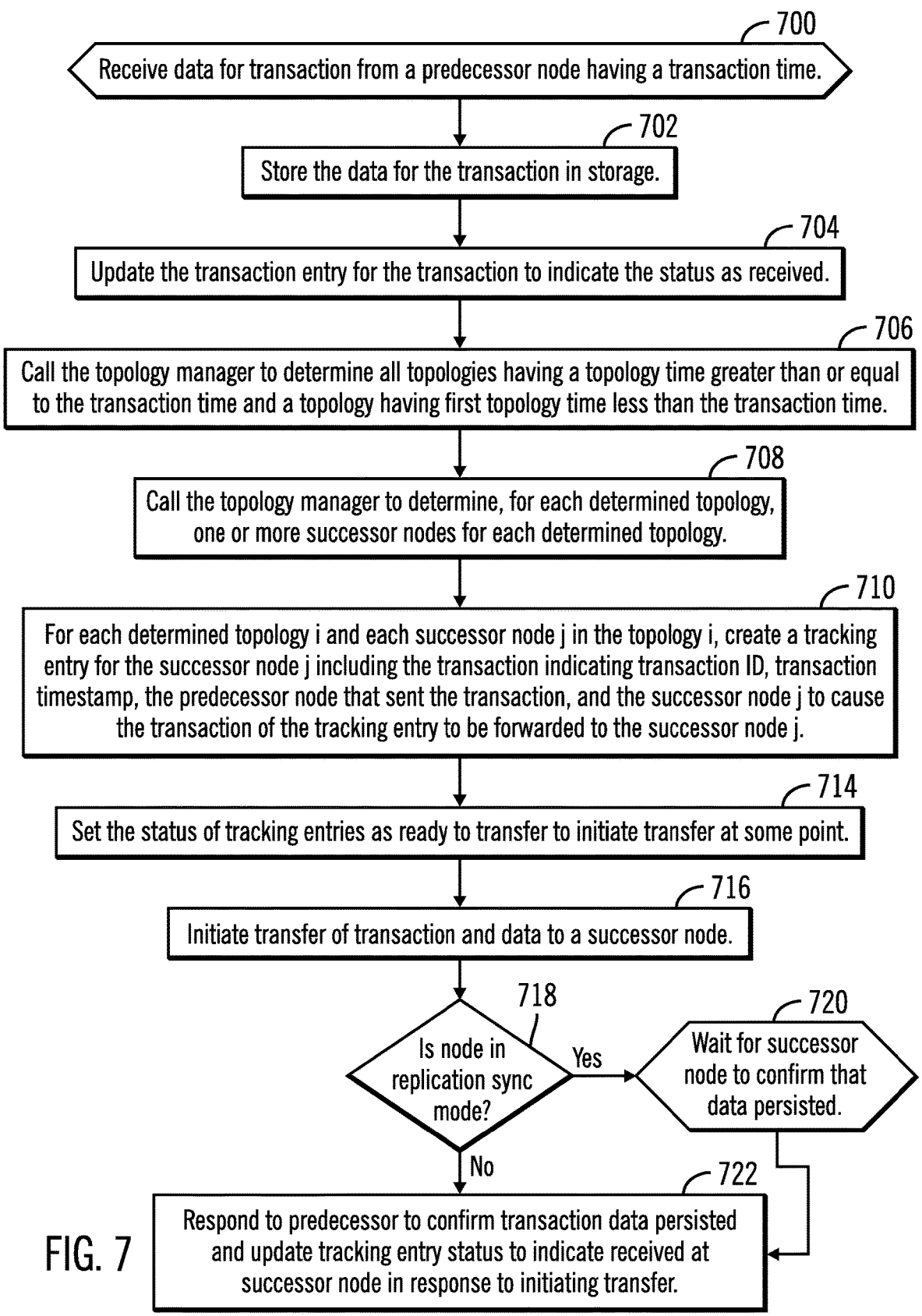
FIG. 7 illustrates an embodiment of operations to process a transaction received from a predecessor node.

FIG. 7 illustrates an embodiment of operations performed by components at a node $200_i$, such as by the content manager 212 and topology manager 206, to process data for a transaction from a predecessor node $200_P$ having a transaction time 404. Upon receiving (at block 700) data for a transaction from the predecessor node $200_P$, the content manager 212 stores (at block 702) the data or payload for the received transaction in storage 206. The transaction entry $400_i$ for the received transaction is updated (at block 704) to indicate the status 406 as data received. In one embodiment, the transaction entry $400_i$ would be created at all nodes in the network 100 upon the source node 302 generating the transaction, before transmitted the data for the transaction. The initial status 406 for the created transaction may be not received. Alternatively, the transaction entry $400_i$ may be created at a node $200_i$ upon receiving the transaction.

The topology manager 206 is called (at block 706) to determine all topologies $300_i$ having a topology time 304 greater than or equal to the transaction time 404 and one topology having a first topology time 304 less than the transaction time 404. The topology manager 206 is further called (at block 708) to determine one or more successor nodes $200_S$ for each determined topology $300_i$. For each determined topology $300_i$ and each determined successor node j of the topology $300_i$, the content manager 212 creates (at block 710) a tracking entry $500_k$ for the transaction indicating the information 502, 504, and 506, including the predecessor node 508 that forwarded the transaction and the successor node j in field 510 to cause the transaction of the tracking entry $500_k$ to be forwarded to the successor node 510. In an alternative embodiment, there may be one tracking entry $500_k$ indicating multiple of the successor nodes. The status 512 for the tracking entries $500_k$ is set (at block 714) to received and ready to transfer. In one embodiment, the tracking entry $500_i$ may be created through steps 706, 708, 710, 712 in FIG. 7 in response to receiving the transaction and payload. In an alternative embodiment, the tracking entry $500_i$ may be initially created upon receiving notification of the creation of the transaction at the source node 102 before being transmitted through the topology, and would have a status 512 indicating not received.

The content manager 212 initiates (at block 716) transfer of the transaction and data to a successor node $200_S$, which may be performed as part of a batch process of a group of transactions for tacking entries $500_i$. If (at block 718) the node $200_i$ is in a replication synchronization mode, then the content manager 212 waits (at block 720) for the successor node $200_S$ to confirm that the data for the transaction is persisted at the storage 206 in the successor node $200_S$ before responding (at block 722) to the predecessor node 508 to confirm the transaction data is persisted and to indicate the status 512 of the tracking entry $500_i$ as received at the successor node $200_S$. If (at block 716) the node $200_i$ is in an asynchronous replication mode, then complete is indicated at block 722 in response to initiating the transfer.

In one embodiment, the first node in the topology comprising a successor node to the source node 102 is in a replication synchronous mode and other intermediary nodes $200_i$ following the immediate successor node to the source node 102 are in an asynchronous mode. In this way, synchronous mode is only required for the first transmission to ensure the data for a transaction is replicated to at least one intermediary node for redundancy and disaster recovery With the embodiment of FIG. 7, information for managing the flow of transactions through the nodes of the topology is generated in the form of tracking entries that track the status of the flow of transactions at the nodes through the topology nodes. The timestamp is used to create a tracking entry $500_i$ for a latest topology where the transaction time is less than the topology creation time to ensure the topology is used that was active at the transaction time. Further, tracking entries are created having topology times greater than the transaction time to ensure that open transactions are always sent using a new route (as old route might be lost).

Below is an example of how the transaction time topology times are used:
    topology #5 defined at 05:00
    topology #4 defined at 04:00
    topology #3 defined at 03:00
    topology #2 defined at 02:00
    topology #1 defined at 01:00

Below is an example of how a transaction created at 2:30 will be routed across the above five topologies:
    transaction time (02:30)<topology #5 (05:00)—tracking entry will be created
    transaction time (02:30)<topology #4 (04:00)—tracking entry will be created
    transaction time (02:30)<topology #3 (03:00)—tracking entry will be created
    transaction time (02:30)>topology #2 (02:00)—tracking entry will be created (being latest topology below the timestamp)
    transaction time (02:30)>topology #1 (01:00)—tracking entry will NOT be created (not latest)

Figure 8:
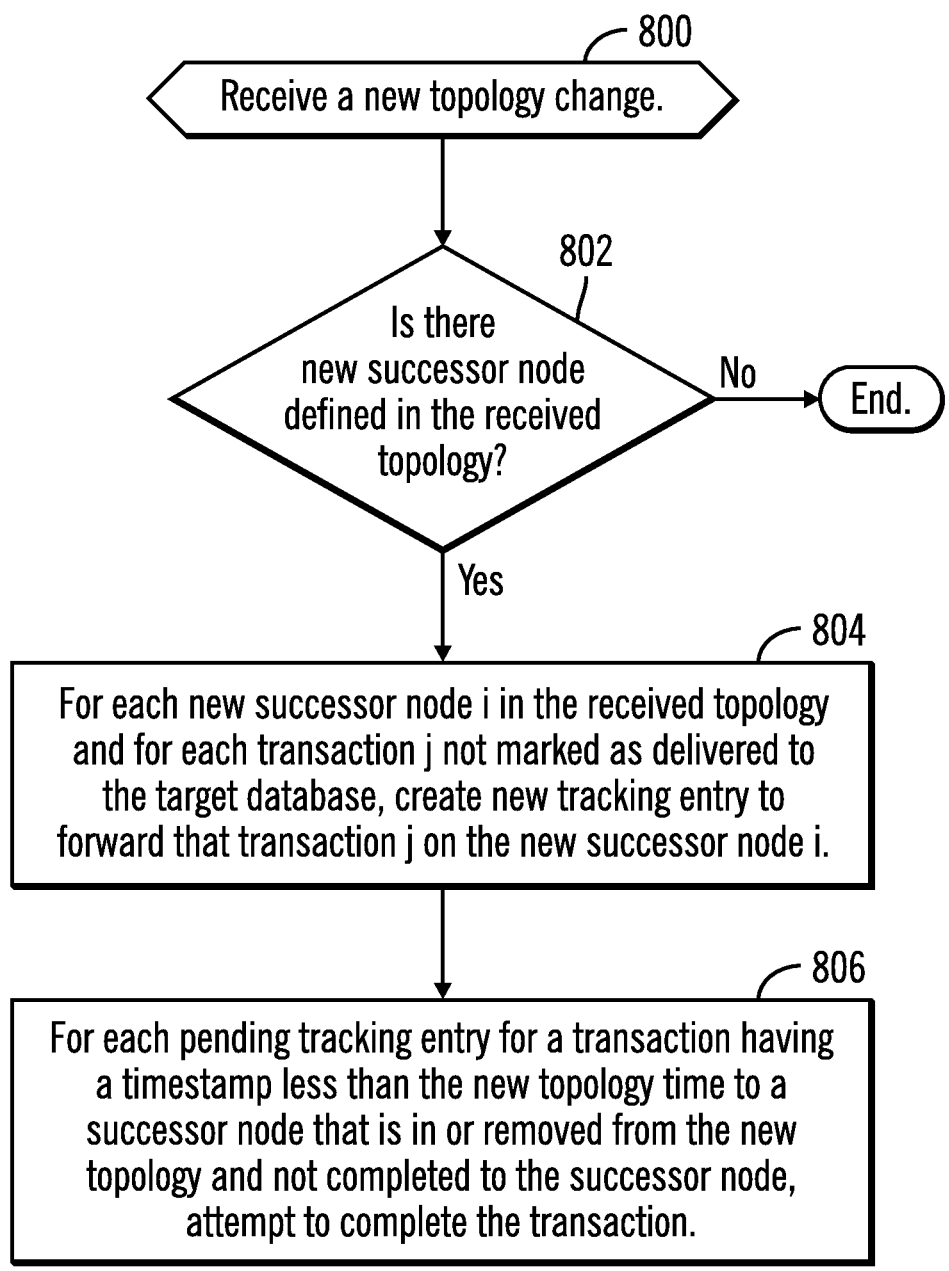
FIG. 8 illustrates an embodiment of operations to resend transactions for a topology change.

FIG. 8 illustrates an embodiment of operations performed by components at a node $200_i$, such as by the content manager 212 and topology manager 206, to create tracking entries $500_i$ for a new topology. Upon initiating (at block 800) to resend transactions upon receiving a topology change or new topology $300_N$, if (at block 802) the content manager 212 determines that there is no new successor node in the received topology $300_N$ not in the current topology $300_C$ then control ends. If (at block 802) there is a new successor node in the received topology $300_N$, then for each new successor node i in the received topology $300_N$ and for each transaction $400_j$ not having status 406 as delivered to the target node $106_i$, a new tracking entry $500_k$ is created (at block 804) to forward that transaction $400_j$ on the new successor node i. Further, for each pending tracking entry $500_m$ for a transaction $400_m$ having a timestamp 404 less than the new topology time 304 to a successor node that is in or removed from the new topology $300_N$ and having status 512 as not completed to the successor node, attempt to complete (at block 806) the transaction identified by the tracking entry $500_m$.

With the embodiment of FIG. 8, upon a topology change or new topology implemented in the network, transactions in transit or already sent to the successor node $200_S$ but not validated as complete at the target nodes $106_1$ and $106_2$ are resent to each new successor node part of the new topology $300_N$ to have transactions from the previous topology available in the new topology. This ensures for redundancy of the data and that the transactions reach the target nodes $106_1$ and $106_2$ through the current topology node flow implemented in the network $100_{T2}$. With the embodiment of FIG. 8, the content manager completes transferring existing transaction payloads until the topology change timestamp and in parallel initiates re-transfer of all transactions where tracking entries are open, have not completed at the target node, to new successor nodes.

Further, if a successor node from a previous topology is removed in a new topology, then tracking entries are created for transactions that have not completed in the previous topology to send to a successor node in the new topology because the successor node replaced in the previous topology may not be available.

Figure 9:
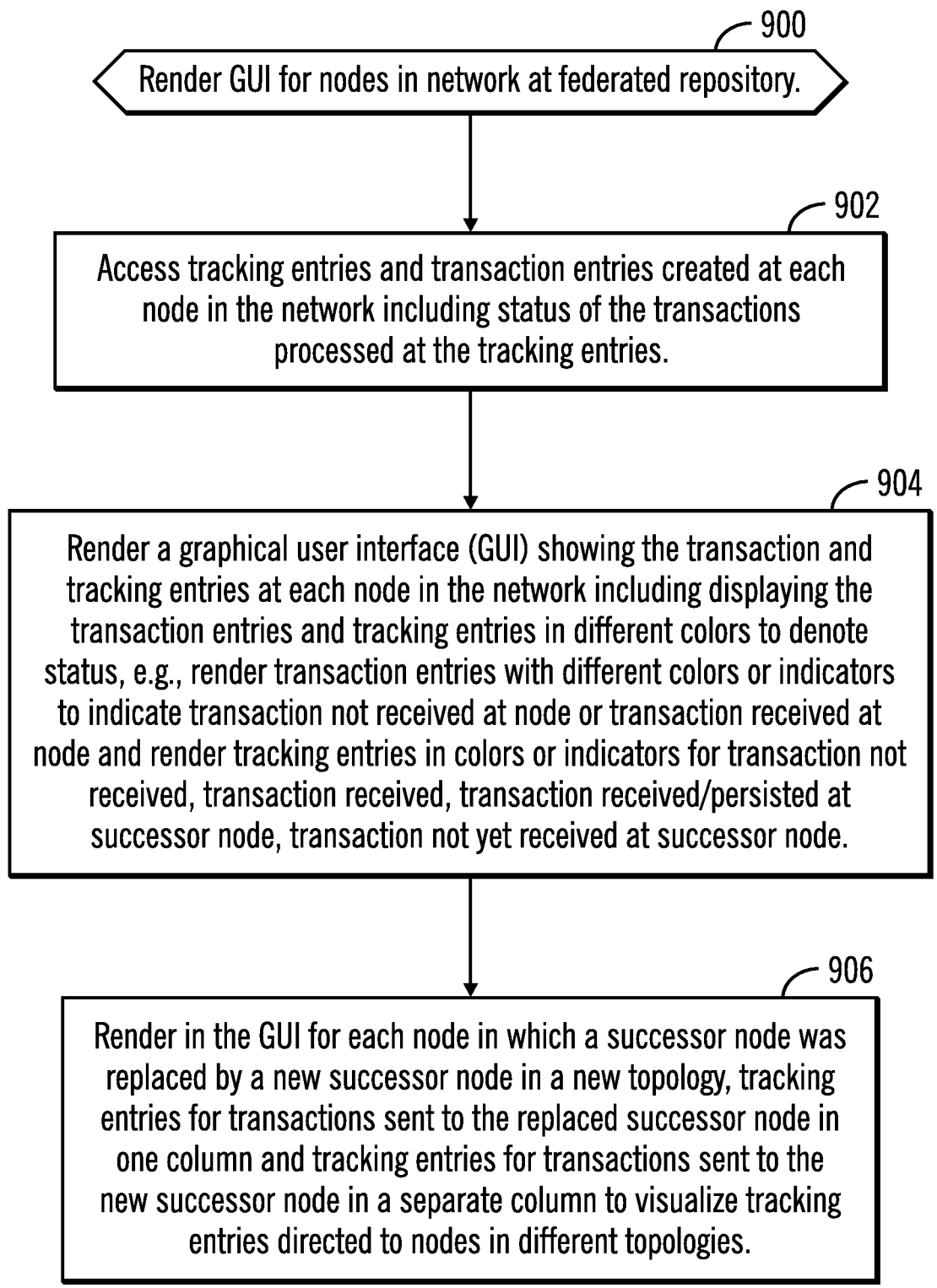
FIG. 9 illustrates an embodiment of operations to render a Graphical User Interface (GUI) of the flow of transactions through nodes in the network.

FIG. 9 illustrates an embodiment of operations performed by the tracking manager 110 in the federated repository 108 to render a graphical user interface (GUI) 114 providing a visualization on the tracking entries $500_i$ at the nodes in the network 100. To render the GUI 114 (at block 900), the tracking manager 110 accesses (at block 902) tracking entries $500_i$ and transaction entries $400_i$ created at each node in the network 100, including status 512 of the transactions processed at the tracking entries $500_i$. The tracking manager 110 renders (at block 904) the GUI 114 showing the accessed transaction $400_i$ and tracking entries $500_i$ at each node in the network including displaying the transaction entries and tracking entries in different colors to denote status 512. Transaction entries $400_i$ rendered in the GUI 114 may be rendered with different visual indicia, such as different colors, highlights, markings, etc., to indicate the transaction is not yet received at the node or transaction received at node. Tracking entries $500_i$ rendered in the GUI 114 may be rendered with different visual indicia to indicate the transaction is not received, transaction received, transaction received/persisted at successor node $200_S$, transaction sent but not yet received at successor node, etc.

The tracking manager 110 may further render (at block 906) in the GUI 114 for each node in which a successor node was replaced by a new successor node in a new topology, tracking entries for transactions sent to the replaced successor node in one column and tracking entries for transactions sent to the new successor node in a separate column to visualize tracking entries directed to nodes in different topologies.

Figure 10:
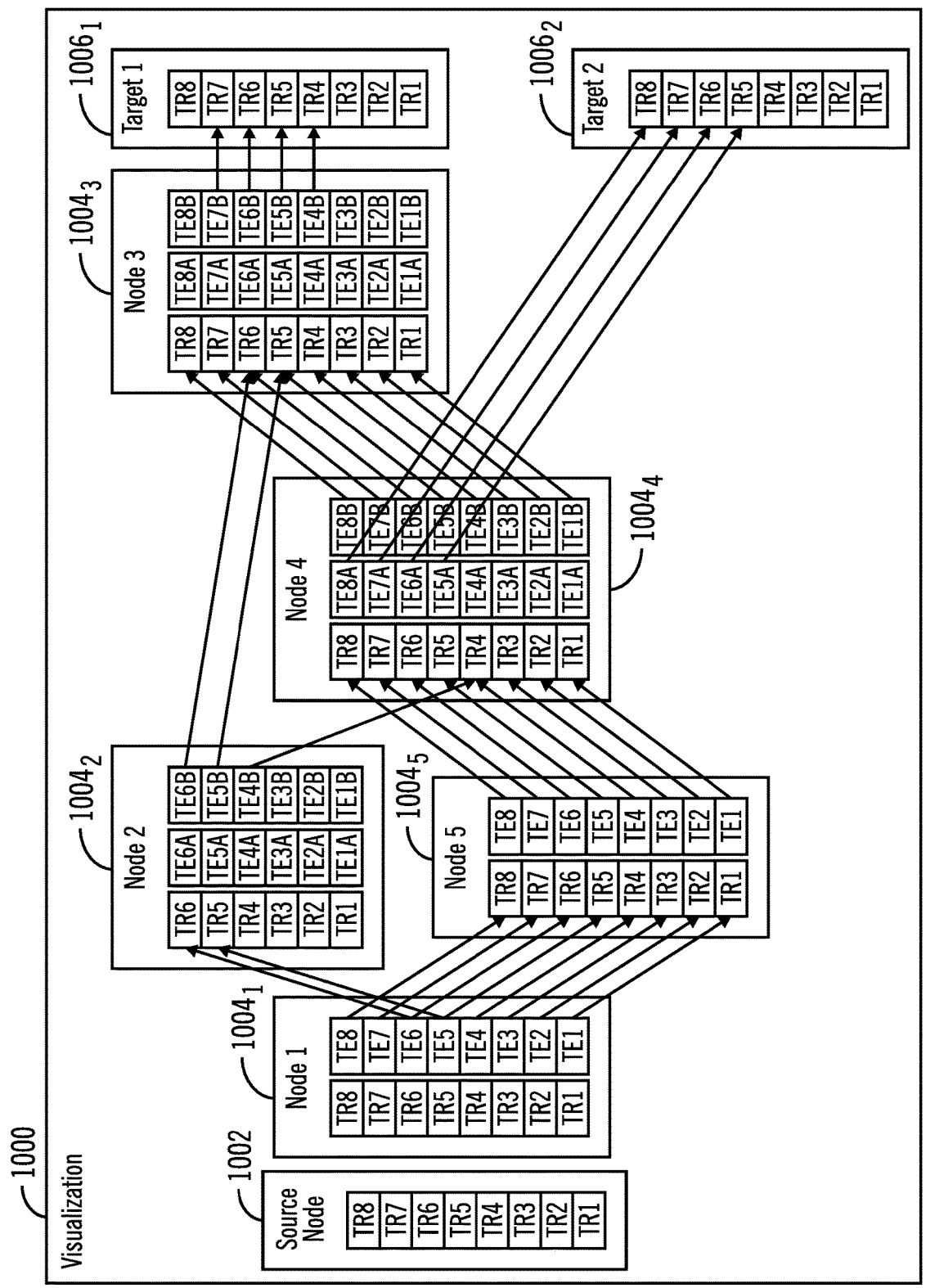
FIG. 10 illustrates an example of a visualization rendered in the GUI of the flow of transactions through nodes in the network.

FIG. 10 illustrates an example of a visualization 1000 of the transaction ("TR") $400_i$ and tracking entries ("TE") $500_i$ in a display monitor for the nodes in the network 100 occurring in an old and new topology, such as shown in FIGS. 1A and 1B, respectively. The source node 1002 is shown as generating transactions TR1 . . . TR8 that are copied over to Node $1004_1$. Transactions TR1 . . . TR6 may have been sent before a topology change for an old topology, and transactions TR7 and TR8 created after a new topology is established. The old topology may be as shown in FIG. 1A and the new topology may be as shown in FIG. 1B. Node $1004_1$ will send all transactions for tracking entries TE1 . . . TE8 to node $1004_5$, part of the new topology (FIG. 1B) and send transactions for tracking entries TE5 and TE6 to node $1004_2$ that have not yet been sent over from the old topology (FIG. 1A).

The visualization 1000 shows how each of the intermediary nodes $1004_2$, $1004_4$, and $1004_3$ generate a first "A" column to manage transactions for the old topology and generate a second column of the "B" to manage transactions for the new topology, to show status for transactions from the old topology that are to be sent during the new topology. For instance, node $1004_2$ part of the old, but not new topology, may continue to send transactions to nodes $1004_3$ and $1004_4$ for data for transactions received during the old topology. The visualization 1000 further shows how transactions for both old and new topologies reach the target nodes $1006_1$ and $1006_2$ from nodes $1004_3$ and $1004_4$. Node $1004_5$ in the new topology sends all transactions to Node $1004_4$ as part of the new topology. Node $1004_4$ which is in both the new and old topologies, sends data for all transactions in the B column to node $1004_3$ in the new topology and data for transactions in the A column for the old topology not sent to target $1006_2$. Node $1004_3$, part of both old and new topologies, sends data for transactions TE4B through TE7B as part of the new topology in the B column, but has no data to send as part of the old topology in the A column.

With the above embodiments, the federated repository 108 renders in the GUI 114 a visualization 1000 that shows the flow of transactions, via tracking entries, through the nodes of the network in different topologies. This allows the administrator to monitor traffic and transaction data being sent through the disaster recovery network and the status of nodes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
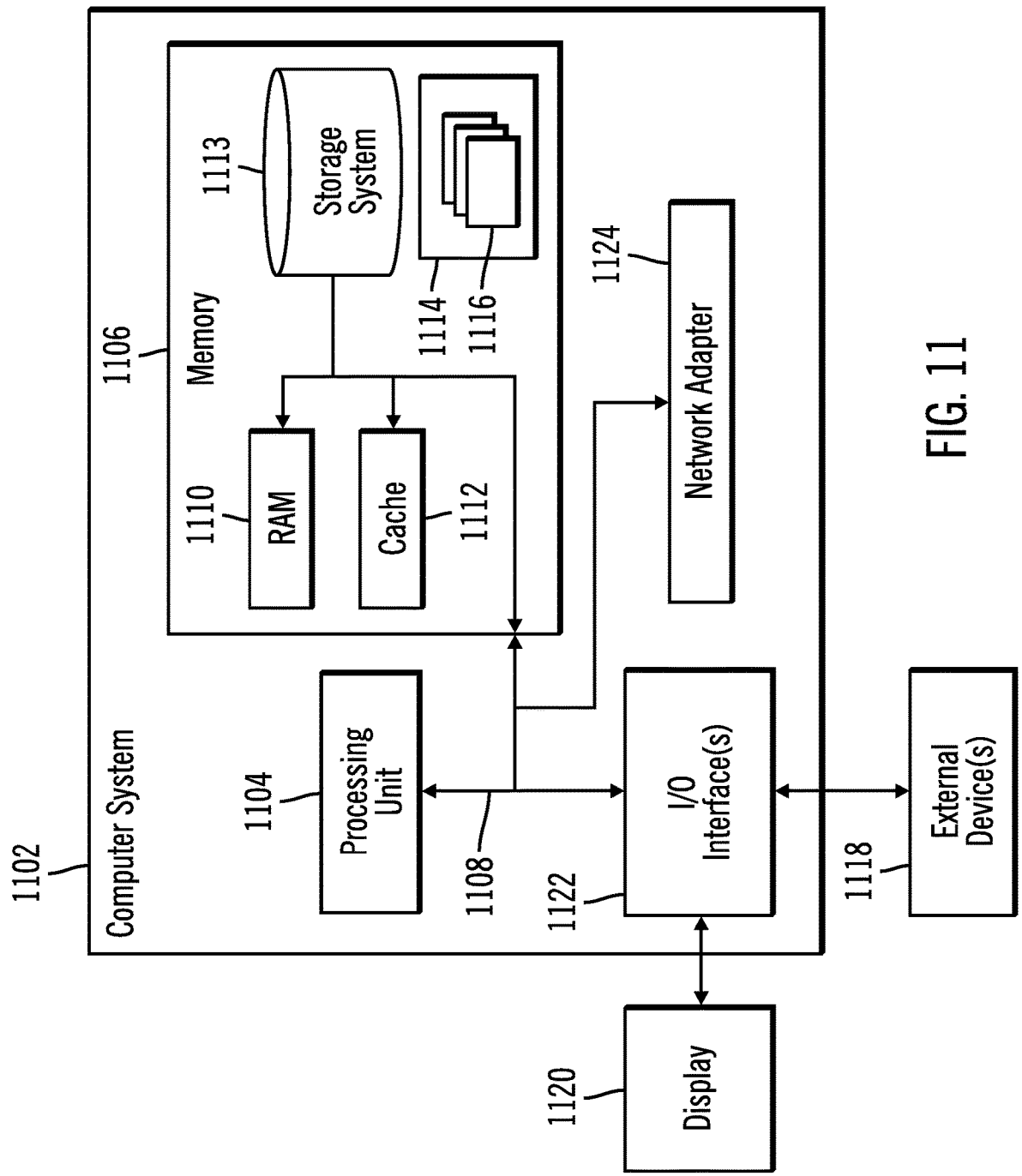
FIG. 11 illustrates a computing environment in which the nodes of FIGS. 1a, 1b, and may be implemented.

The computational components of FIGS. 1a, 1b, and 2 may be implemented in one or more computer systems, such as the computer system 1102 shown in FIG. 11. Computer system/server 1102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, the computer system/server 1102 is shown in the form of a general-purpose computing device. The components of computer system/server 1102 may include, but are not limited to, one or more processors or processing units 1104, a system memory 1106, and a bus 1108 that couples various system components including system memory 1106 to processor 1104. Bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system readable media. Such media may be any available media that is accessible by computer system/server 1102, and it includes both volatile and non-volatile media, removable and non-removable media.

System memory 1106 can include computer system readable media in the form of volatile memory, such as random access memory (RAM) 1110 and/or cache memory 1112. Computer system/server 1102 may further include other removable/non-removable, volatile/non-volatile computer system storage media. By way of example only, storage system 1113 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1108 by one or more data media interfaces. As will be further depicted and described below, memory 1106 may include at least one program product having a set (e.g., at least one) of program modules that are configured to carry out the functions of embodiments of the invention.

Program/utility 1114, having a set (at least one) of program modules 1116, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. The components of the computer 1102 may be implemented as program modules 1116 which generally carry out the functions and/or methodologies of embodiments of the invention as described herein. The systems of FIG. 1 may be implemented in one or more computer systems 1102, where if they are implemented in multiple computer systems 1102, then the computer systems may communicate over a network.

Computer system/server 1102 may also communicate with one or more external devices 1118 such as a keyboard, a pointing device, a display 1120, etc.; one or more devices that enable a user to interact with computer system/server 1102; and/or any devices (e.g., network card, modem, etc.) that enable computer system/server 1102 to communicate with one or more other computing devices. Such communication can occur via Input/Output (I/O) interfaces 1122. Still yet, computer system/server 1102 can communicate with one or more networks such as a local area network (LAN), a general wide area network (WAN), and/or a public network (e.g., the Internet) via network adapter 1124. As depicted, network adapter 1124 communicates with the other components of computer system/server 1102 via bus 1108. It should be understood that although not shown, other hardware and/or software components could be used in conjunction with computer system/server 1102. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing transactions from a source node to a target node via intermediary nodes in a network, wherein the computer program product comprises a computer readable storage medium implemented at each of the intermediary nodes having computer readable program code embodied therein that when executed performs operations at the intermediary nodes, the operations comprising:

creating a first tracking entry representing a transaction to transfer data from the source node to the target node that is received from a predecessor node in a first topology comprising one of the source node and the intermediary nodes to transmit to a first successor node and forward to the target node;

receiving a second topology including indication of a change to the first topology by including a second successor node not in the first topology; and creating a second tracking entry for the transaction received from the predecessor node to send to the second successor node in response to data for the transaction having not yet been delivered to the target node.

2. The computer program product of claim 1, wherein the operations further comprise:
    after receiving the second topology, processing the first tracking entry to transfer data to the first successor node created before receiving the second topology.

3. The computer program product of claim 2, wherein the first successor node is removed from the second topology, wherein the transfer of data to the first successor node for the first tracking entry continues in response to the first successor node available in the network.

4. The computer program product of claim 1, wherein the second tracking entry is created if the data for the transaction has been transmitted to the first successor node but not yet delivered to the target node.

5. The computer program product of claim 1, wherein the operations further comprise:
    determining any additional topologies having topology times greater than a transaction time of the transaction and successor nodes for the additional topologies; and
    creating a tracking entity for the transaction for each additional topology and for each successor node in the additional topology to transfer data for the transaction to each successor node in each of the additional topologies.

6. The computer program product of claim 5, wherein the operations further comprise:
    determining an earlier topology comprising a prior topology having a topology time less than the transaction time; and
    creating a tracking entity for the transaction for the prior topology and for each successor node in the prior topology to transfer data for the transaction to each successor node in the prior topology.

7. The computer program product of claim 1, wherein the operations further comprise:
    in response to receiving the second topology, determining tracking entries for transactions whose data was transmitted to the first successor node that have not been confirmed as delivered to the target node; and
    transmitting the data for the transactions for the determined tracking entries to the second successor node.

8. The computer program product of claim 1, wherein the operations at the first successor node further comprise:
    in response to receiving the second topology, transmitting data for the transaction for the first tracking entry to a third node that is a successor to the first successor node.

9. The computer program product of claim 1, wherein the operations at a third node that is a successor to both the first successor node and the second successor node comprises:
    receiving data for a same transaction to transfer to the target node from both the first successor node and the second successor node;
    providing a first tracking entry for the same transaction at the third node indicating the first successor node as a first predecessor node; and
    providing a second tracking entry for the same transaction at the third node indicating the second successor node as a second predecessor node.

10. A computer program product for providing information on transactions from a source node to a target node via intermediary nodes between the source node and the target node in a network, wherein the computer program product comprises a computer readable storage medium having computer readable program code embodied therein that when executed performs operations, the operations comprising:
    maintaining tracking entries for transactions to transfer data between the source node and the target node at intermediary nodes, wherein the transactions are transmitted to the intermediary nodes according to a first topology, wherein for each pending transaction and node in the network there is a tracking entry, wherein a tracking entry of the tracking entries for each node indicates a predecessor node in the first topology and causes transfer of data from the predecessor node to a first successor node in the first topology;
    generating a second topology including a second successor node to the predecessor node not in the first topology; and
    for transactions having tracking entries for the first topology that have not been confirmed as delivered to the target node, creating tracking entries to transfer data to the second successor node that have not been confirmed as delivered to the target node.

11. The computer program product of claim 10, wherein the operations further comprise:
    rendering, in a graphical user interface (GUI), transaction entries at the source node, the intermediary nodes to receive data for the transaction entries according to the first or second topology, and the target node, wherein the transaction entries are rendered with one of a plurality of visual indicia that indicate a status of the transaction as received at an intermediary node and the target node; and
    rendering, in the GUI, the first and second tracking entries at the intermediary nodes, wherein the first and second tracking entries are rendered with one of a plurality of visual indicia that indicate a status of the transaction.

12. The computer program product of claim 11, wherein the operations further comprise:
    for a node having tracking entries representing transactions to forward to the first successor node and the second successor node, rendering in the GUI tracking entries to forward to the first successor node in a first column and rendering in the GUI tracking entries to forward to the second successor node in a second column.

13. A system comprising an intermediary node in a network having a plurality of intermediary nodes to manage transactions from a source node to a target node, comprising:
    a processor; and
    computer readable storage medium having computer readable program code embodied therein that when executed by the processor performs operations, the operations comprising:
        creating a first tracking entry representing a transaction to transfer data from the source node to the target node that is received from a predecessor node in a first topology comprising one of the source node and the intermediary nodes to transmit to a first successor node and forward to the target node;
        receiving a second topology including indication of a change to the first topology by including a second successor node not in the first topology; and
        creating a second tracking entry for the transaction received from the predecessor node to send to the second successor node in response to data for the transaction having not yet been delivered to the target node.

14. The system of claim 13, wherein the second tracking entry is created if the data for the transaction has been transmitted to the first successor node but not yet delivered to the target node.

15. The system of claim 13, wherein the operations further comprise:
   determining any additional topologies having topology times greater than a transaction time of the transaction and successor nodes for the additional topologies; and
   creating a tracking entity for the transaction for each additional topology and for each successor node in the additional topology to transfer data for the transaction to each successor node in each of the additional topologies.

16. The system of claim 15, wherein the operations further comprise:
   determining an earlier topology comprising a prior topology having a topology time less than the transaction time; and
   creating a tracking entity for the transaction for the prior topology and for each successor node in the prior topology to transfer data for the transaction to each successor node in the prior topology.

17. The system of claim 13, wherein the operations further comprise:
   in response to receiving the second topology, determining tracking entries for transactions whose data was transmitted to the first successor node that have not been confirmed as delivered to the target node; and
   transmitting the data for the transactions for the determined tracking entries to the second successor node.

18. A system for providing information on transactions from a source node to a target node via intermediary nodes between the source node and the target node in a network, comprising:
   a processor;
   a computer readable program code embodied therein that when executed by the processor performs operations, the operations comprising:
   maintaining tracking entries for transactions to transfer data between the source node and the target node at intermediary nodes, wherein the transactions are transmitted to the intermediary nodes according to a first topology, wherein for each pending transaction and node in the network there is a tracking entry, wherein a tracking entry of the tracking entries for each node indicates a predecessor node in the first topology and causes transfer of data from the predecessor node to a first successor node in the first topology;
   generating a second topology including a second successor node to the predecessor node not in the first topology; and
   for transactions having tracking entries for the first topology that have not been confirmed as delivered to the target node, creating tracking entries to transfer data to the second successor node that have not been confirmed as delivered to the target node.

19. The system of claim 18, wherein the operations further comprise:
   rendering, in a graphical user interface (GUI), transaction entries at the source node, the intermediary nodes to receive data for the transaction entries according to the first or second topology, and the target node, wherein the transaction entries are rendered with one of a plurality of visual indicia that indicate a status of the transaction as received at an intermediary node and the target node; and
   rendering, in the GUI, the first and second tracking entries at the intermediary nodes, wherein the first and second tracking entries are rendered with one of a plurality of visual indicia that indicate a status of the transaction.

20. The system of claim 19, wherein the operations further comprise:
   for a node having tracking entries representing transactions to forward to the first successor node and the second successor node, rendering in the GUI tracking entries to forward to the first successor node in a first column and rendering in the GUI tracking entries to forward to the second successor node in a second column.

21. A method for managing transactions from a source node to a target node at intermediary nodes between the source node and the target node, comprising:
   creating a first tracking entry representing a transaction to transfer data from the source node to the target node that is received from a predecessor node in a first topology comprising one of the source node and the intermediary nodes to transmit to a first successor node and forward to the target node;
   receiving a second topology including indication of a change to the first topology by including a second successor node not in the first topology; and
   creating a second tracking entry for the transaction received from the predecessor node to send to the second successor node in response to data for the transaction having not yet been delivered to the target node.

22. The method of claim 21, wherein the second tracking entry is created if the data for the transaction has been transmitted to the first successor node but not yet delivered to the target node.

23. The method of claim 21, further comprising:
   determining any additional topologies having topology times greater than a transaction time of the transaction and successor nodes for the additional topologies; and
   creating a tracking entity for the transaction for each additional topology and for each successor node in the additional topology to transfer data for the transaction to each successor node in each of the additional topologies.

24. The method of claim 23, further comprising:
   determining an earlier topology comprising a prior topology having a topology time less than the transaction time; and
   creating a tracking entity for the transaction for the prior topology and for each successor node in the prior topology to transfer data for the transaction to each successor node in the prior topology.

25. The method of claim 21, further comprising:
   in response to receiving the second topology, determining tracking entries for transactions whose data was transmitted to the first successor node that have not been confirmed as delivered to the target node; and
   transmitting the data for the transactions for the determined tracking entries to the second successor node.

* * * * *